.

US009460163B1

(12) United States Patent
Toal et al.

(10) Patent No.: US 9,460,163 B1
(45) Date of Patent: Oct. 4, 2016

(54) CONFIGURABLE EXTRACTIONS IN SOCIAL MEDIA

(71) Applicant: Amazon Technologies, Inc., Reno, NV (US)

(72) Inventors: Colin Kieron Toal, St. Thomas (CA); Catherine Ann Champion, Algona, WA (US); Jacqueline Joanne van der Net, Burien, WA (US); Olivier Suritz, Toronto (CA); William Alfred Nagel, Seattle, WA (US); Daniel Seiji Kuwahara, Waterloo (CA)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 13/851,576

(22) Filed: Mar. 27, 2013

(51) Int. Cl.
*G06F 7/00* (2006.01)
*G06F 17/30* (2006.01)
*G06Q 30/02* (2012.01)

(52) U.S. Cl.
CPC ... *G06F 17/30554* (2013.01); *G06F 17/30876* (2013.01); *G06Q 30/0201* (2013.01); *G06F 2216/03* (2013.01)

(58) Field of Classification Search
CPC ............ G06F 17/30876; G06F 2216/03; G06Q 30/0201
USPC ........................................................ 707/776
See application file for complete search history.

(56) References Cited

U.S. PATENT DOCUMENTS

| 7,895,227 | B1* | 2/2011 | Henderson ................... 707/769 |
| 2007/0288312 | A1* | 12/2007 | Wang ................. G06Q 30/0214 705/14.16 |
| 2008/0147487 | A1* | 6/2008 | Hirshberg ....................... 705/10 |
| 2009/0007271 | A1* | 1/2009 | Huang ..................... G06F 21/57 726/26 |
| 2009/0217208 | A1* | 8/2009 | Mushtaq et al. ............. 715/854 |
| 2010/0325107 | A1* | 12/2010 | Kenton et al. ................ 707/723 |
| 2011/0282734 | A1* | 11/2011 | Zurada ................... G06Q 30/02 705/14.49 |
| 2012/0253885 | A1* | 10/2012 | Newton ...................... 705/7.29 |
| 2012/0253917 | A1* | 10/2012 | Cho et al. .................. 705/14.39 |
| 2013/0332219 | A1* | 12/2013 | Clark et al. ................. 705/7.19 |
| 2014/0081998 | A1* | 3/2014 | Fan .................... G06F 17/30241 707/754 |

* cited by examiner

*Primary Examiner* — Marc Somers
(74) *Attorney, Agent, or Firm* — Thomas | Horstemeyer, LLP (57) ABSTRACT

Disclosed are various embodiments for accessing and processing social media content. An extraction configuration comprising definitions for keywords, social networks, extraction times, and/or actions to be initiated upon a detection of a condition may be defined by a user of a site monitoring system. The defined social networks may be accessed at the defined extraction times to obtain data from a post comprising the defined keyword. The presence of some data in association with the post may initiate an action defined by the user.

19 Claims, 10 Drawing Sheets

"type": "rich",
  "author_name": "Social Network API",

"name": "Doug Johnson"
  "id": "012903"                              609
  "user_name": "dougjohnson48"
  "location": "Atlanta, GA"
  "message": "Just received my shipment from Example.com. I really love this thing!",  ← 606

"profile_url": "https://www.examplesocialnetwork.com/profile/012903.php",
  "profile_img_url": "https://www.examplesocialnetwork.com/profile/images/012903.png", "time_zone": {
     "name": "Eastern Time (US & Canada)",                              612
     "tzinfo_name": "America/New_York",
     "utc_offset": -28800
  },                                          615
  "location": [
     {
        "country": "United States",
        "countryCode": "US",
        "name": "Atlanta",
        "state": "Georgia"
     }                                618
  ],
  }                                                                 603
```

FIG. 6A

```html
<html>
  <head>
    <title>Social Network Profile for Doug Johnson</title>
  </head>

<body bgcolor="#FFF">

<img src="https://www.examplesocialnetwork.com/profile/images/012903.png" alt="Profile Picture"/>

<h1>Doug Johnson (dougjohnson48)</h1>

<p>
            Age: 26 <br/>
            Sex: Male <br/>
            Martial Status: Single <br/>
            Location: Atlanta, GA <br/>
            Occupation: Sofware Engineer @ <a href=http://www.example.com">TechCo.</a>
      </p>

<h2>Recent Posts:</h2>           ↖
                                        630
      <p>
            Just received my shipment from Example.com. I really love this thing!
            <div>Posted at 10/11/2013</div>
            <div><a href="#">5 Likes</a> | <a href="#">2 Comments</a> | <a href="#">3 Shares</a></div>

</p>                              ↖
                                        242a
      <p>
            Just received my shipment from Example.com. I really love this thing!
            <div>Posted at 10/11/2013</div>
            <div>
                  <a href="#">5 Likes</a> | <a href="#">2 Comments</a> | <a href="#">3 Shares</a>
            </div>

</p>                              ↖
                                        242b
</body>
</html>                                         ↖
                                                 621
```

CONFIGURABLE EXTRACTIONS IN SOCIAL MEDIA

BACKGROUND

Social networking has emerged to become a premium medium of communication for users in the electronic marketplace. Also, social networking sites produce vast amounts of data. Accessing and processing the vast amounts of data in a meaningful manner capable of discernment remains problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to accessing and processing social media content. Social networking has emerged to become a premium medium of communication for users in the electronic marketplace. For example, users may voice their comments about products and/or services, whether positive or negative, by writing and submitting posts available on one or more social networking sites. Similarly, social networking sites may be used by customer service agents to identify communications relating to one or more items for sell in various marketplaces (e.g., electronic marketplaces). For example, customer service agents may use posts to identify feedback associated with services and/or products as well as communicate with other customer service agents. As may be appreciated, these types of social networking sites produce vast amounts of data. For example, social networking sites may handle millions to hundreds of millions of posts in a given day. Accessing and processing the vast amounts of data in a meaningful manner capable of discernment remains problematic.

Accordingly, it may be desirable to sort through vast amounts of social networking data to identify relevant information based on user-defined extraction configurations, all while ignoring irrelevant and/or redundant information. Such user-defined configurations may include search strings, keywords, social networking sites, extraction times, actions, events, notifications, etc., as will be discussed in greater detail below.

In the following discussion, a general description of the system and its components is provided, followed by a discussion of the operation of the same.

Figure 1:
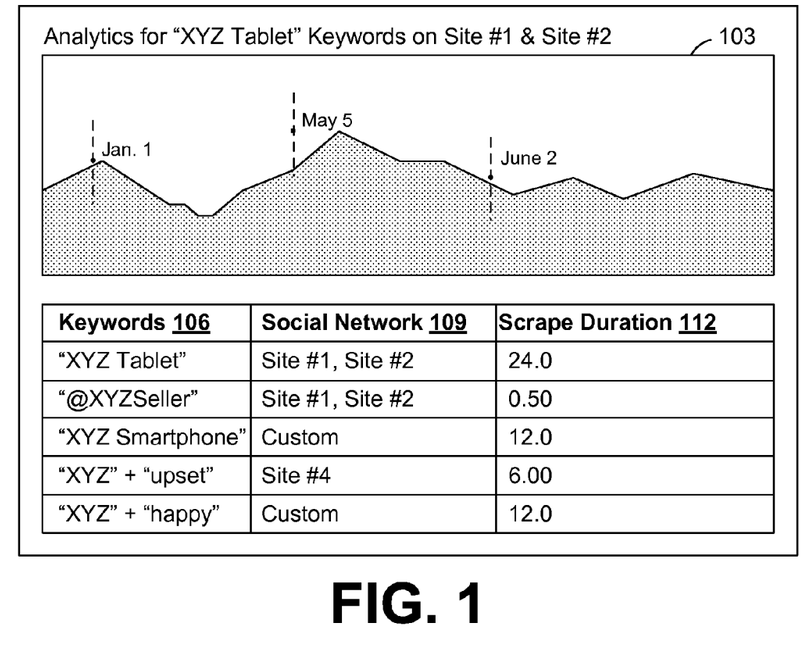
FIG. 1 is a drawing of graph comprising statistical information obtained from a site monitoring service based on a user-defined extraction configuration according to various embodiments of the present disclosure.

With reference to FIG. 1, shown is a non-limiting example a graph 103 comprising statistical information associated, for example, with social networking posts accessed based on an extraction configuration defined by a user of a site monitoring service. In the non-limiting example of FIG. 1, an extraction configuration defined by a user may comprise keywords 106, social networks 109, scrape durations 112, and/or other information to be used by a site monitoring service. Accordingly, the site monitoring service may access the defined social networks 109, or other defined sources, at the defined scrape durations 112 to search for the defined keywords 106.

As a non-limiting example, a merchant selling items via an electronic commerce application may sell, for example, electronic equipment under a mock "XYZ" brand. The merchant may desire to determine sentiment of buyers of the "XYZ" brand (e.g., to determine whether to continue selling the "XYZ" products, the quality of the "XYZ" products, etc.). Accordingly, the merchant may define a keyword 106 and/or search string of "'XYZ'+'angry'." The merchant may further define a social network site 109 and a scrape duration 112. A site monitoring service may search the defined social network site, or other defined source, at the defined scrape duration 112 for the search string provided by the merchant. The information defined by the user comprises at least a portion of an extraction configuration, the extraction configuration to be utilized by the site monitoring service in extracting posts and/or information associated with posts from one or more sources. A graph 103 may be presented comprising the number of posts containing the string "XYZ Tablet" between a predefined range of time. As may be appreciated, other information and/or analytics associated with identified posts may be obtained and/or shown.

Next, a discussion of the computing environment is provided in which the information obtained from posts is determined followed by a discussion of the operation of the same.

Figure 2:
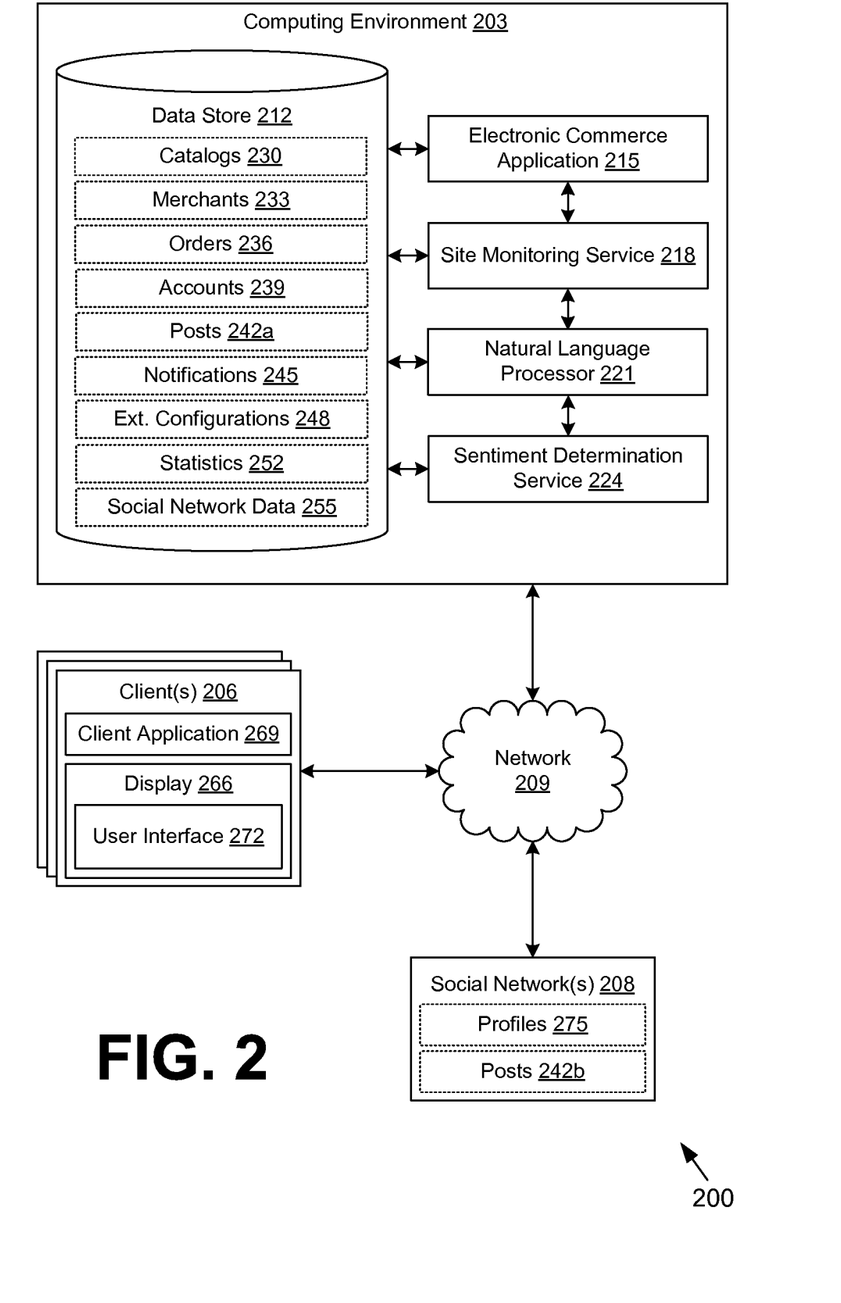
FIG. 2 is a drawing of a networked environment comprising the site monitoring service of FIG. 1 according to various embodiments of the present disclosure.

With reference to FIG. 2, shown is a networked environment 200 according to various embodiments. The networked environment 200 includes a computing environment 203, a client device 206, and one or more social networks 208, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time. Additionally, some or all of the components of the computing environment 203 may be used internally by an entity and/or may be made available to third-parties, for example, as a web service in response to a subscription.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce application 215, a site monitoring service 218, a natural language processor 221, a sentiment determination service 224, and other applications, services, processes, systems, engines, or functionality not discussed in detail herein.

The electronic commerce system 215 is executed in order to facilitate the online purchase of items and/or services over the network 209. The electronic commerce system 215 also performs various backend functions associated with the online presence of a merchant in order to facilitate the online purchase of items and/or services as will be described. For example, the electronic commerce system 215 generates network pages such as web pages or other types of network content that are provided to clients 206 for the purposes of selecting items for purchase, rental, download, lease, or other form of consumption as will be described.

The site monitoring service 218 is executed to scrape and/or extract information from sources (e.g., web pages, social networking sites, blogs, etc.) based on an extraction configuration. An extraction configuration may comprise, for example, keywords, search strings, web page definitions, social network site definitions, blog definitions, scrape and/or extraction times, actions to initiate, events to occur, notifications to be transmitted, tickets to be created and/or escalated, and/or any other information. The site monitoring service 218 may communicate with the natural language processor 221 and/or the sentiment determination service 224 in extracting and/or interpreting information from the one or more posts. The site monitoring service 218 may further communicate with the electronic commerce application 215 in identifying items mentioned in the posts and/or associating posts with users of the defined sources (e.g., users of a social networking site). Moreover, the site monitoring service 218 may communicate with one or more social networks 208 via an API or other means as will be discussed in greater detail below.

The natural language processor 221 is executed to derive meaning from posts submitted by users of a social networking site or from a similar system by employing known heuristics and/or derivation strategies. For example, a user may have submitted a post stating, "I purchased a widget from Example.com." The natural language processor 221 may derive that the author of the post claimed to have purchased an item (the widget) from an electronic commerce site (Example.com).

Furthermore, the natural language processor 221 may employ machine learning to improve the derivation of meaning from posts. As may be appreciated, human language is constantly changing and evolving. Accordingly, the natural language processor 221 may identify new terms (e.g., slang terms) and communicate with external services to define the new terms to be employed in future derivations. In addition to new words or phrases, the natural language processor 221 may employ known machine learning techniques to identify relevant from irrelevant posts. By employing machine learning, future posts may have a higher degree of accuracy in being classified as relevant or irrelevant. Irrelevant posts may be ignored by the site monitoring service 218, as may be appreciated.

The sentiment determination service 224 is executed to derive sentiment from a meaning of a post determined by the natural language processor 221. To expand on the example above, a user may have submitted a post stating, "I purchased a widget from Example.com, and I love it!" Alternatively, the user may have submitted a post stating, "I purchased a widget from Example.com, and I hate it!" The sentiment determination service 224 may identify that the word "love" or "hate" was used in the post. Accordingly, the sentiment determination service 224 may identify and associate a sentiment level with the post. As discussed above, the site monitoring service 218 may take action in response to an identified sentiment level. For example, if a user disliked a purchased product, the merchant may be notified of the user's dissatisfaction.

The data stored in the data store 212 includes, for example, data associated with catalogs 230, merchants 233, orders 236, accounts 239, posts 242a, notifications 245, extraction configurations 248, statistics 252, and potentially other data including social network data 255. Data associated with catalogs 230 may include information related to a plurality of items offered for order through the electronic commerce application 215. An item may refer to a product, good, service, software download, multimedia download, social networking profile, or any combination, bundle, or package thereof, that may be offered for sale, purchase, rental, lease, download, and/or any other form of consumption as may be appreciated. The various data associated with catalogs 230 may include, for example, titles, descriptions, quantities, conditions, images, options, weights, volumes, customer reviews, customer ratings, keywords, shipping restrictions, prices, tax classifications, unique identifiers, and any other data related to items.

Merchants 233 may comprise any sellers and/or vendors on the electronic commerce application 215, as may be appreciated. Orders 236 may comprise data associated with the sale, purchase, rental, lease, download, and/or any other form of consumption of any of the items offered via the electronic commerce application 215. Accounts 239 may comprise data associated with any users of the electronic commerce application 215 and/or the site monitoring service 218. Accounts 239 may further comprise data related to users of a social network 208, as may be appreciated. Posts 242 may comprise data associated with a post, entry, comment, listing, and/or any other mode of speech, made by a user on a source (e.g., a blog, social network, web page, item comments, etc.).

Notifications 245 may comprise data associated with notifications to transmit defined by a user in association with an extraction configuration 248. For example, a user may desire to be notified immediately when a post 242 is made comprising the keyword "#URGENT." Accordingly, a notification 245 may be made via e-mail, Short Message Service (SMS), phone call/voicemail, pop-up message, a modification of a network page, and/or any other medium of communication. Extraction configurations 248 may comprise definitions for keywords, social networks, scrape durations, actions to initiate, notifications 245, and/or any other information via the site monitoring service 218 to be utilized in extracting information from one or more sites. Statistics 252 may comprise statistical information associated with one or more posts 242 determined, for example, by site monitoring service 218 and/or a social networking site.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application 269 and/or other applications. The client application 269 may be executed in a client 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page, an application screen, etc. The client 206 may be configured to execute applications beyond the client application 269 such as, for example, email applications, social networking applications, word processors, spreadsheets, and/or other applications.

The one or more social networks 208 may be network pages rendered by social networking applications. For example, users of the social networks 208 may have a profile 275 comprising information and/or posts 242b associated with the users. In an alternative embodiment, the social network 208 may be one or more application programming interfaces (API) configured to provide data from the social networking applications, typically data a social networking application makes publicly available. The social networks 208 may be accessed by the computing environment 203 as will be discussed in greater detail below.

Next, a general description of the operation of the various components of the networked environment 200 is provided. To begin, one or more users of the site monitoring service may provide an extraction configuration 248 comprising definitions for keywords, social networks, scrape durations, actions to initiate, events, notifications 245, and/or any other information via the site monitoring service 218 to be stored for future access in, for example, data store 212. The extraction configurations 248 may be accessed and/or received by the site monitoring service 218. As a non-limiting example, a merchant may have defined keywords to be searched for on defined social networks at defined scrape durations. The site monitoring service 218 may have stored the definition in, for example, data store 212 to be accessed at a later time.

In one embodiment, actions to initiate upon the occurrence of condition may be defined as a numeric threshold of posts 242. For example, if a significant portion of posts 242 comprise one or more keywords, phrases, and/or identifiers (e.g., a hash tag and a keyword), an action defined by the user may be initiated. Thus, when a certain amount of post traffic meets or exceeds the threshold, an occurrence of the defined action may be initiated by the site monitoring system 218.

The extraction configuration 248 comprising the definitions is subsequently used to search for, query, and/or extract data from posts 242. As a non-limiting example, a merchant may have defined a search to occur on a predefined social networking application, repeated every half hour, looking for "XYZ Tablet." The definitions (the social networking application, the scrape duration, and/or the search string) may be used to search the predefined social networking application. In the event no posts 242 are found in the query, an action may automatically be initiated. For example, the merchant may have predefined the action of receiving an e-mail when a search has been conducted resulting in no posts 242 being found. The posts 242 may be accessed by communicating with the social networks via an API and/or extracting the information from a source of a network page encoded by the social network 208. Alternatively, the posts 242 may be accessed and/or received in response to a push notification transmitted by the social network 208. The push notification may be made by predefining an extraction configuration with the social network 208, as may be appreciated. The site monitoring service 218 may identify a relevancy of a post 242 based at least in part on the extraction configuration 248 defined by the user.

Subsequently, the natural language processor 221 may employ natural language processing to the posts 242 and/or the information extracted from the posts 242. The natural language processor 221, or a similar service, may derive meaning from the posts 242 by employing known heuristics and/or derivation strategies. For example, a user may have submitted a post 242 stating, "I purchased a widget from Example.com." The natural language processor 221 may derive that the author of the post 242 claimed to have purchased an item (the widget) from an electronic commerce site (Example.com).

The sentiment determination service 224 may determine a sentiment level from the posts 242. For example, a user may have submitted a post 242 stating, "I purchased a widget from Example.com, and I love it!" Alternatively, the user may have submitted a post 242 stating, "I purchased a widget from Example.com, and I hate it!" The sentiment determination service 224 may identify that the word "love" or "hate" was used in the post 242. Accordingly, the sentiment determination service 224 may identify and associate a sentiment level with each of the posts 242.

The site monitoring service 218 may then determine whether one or more items available in the catalog 230 is able to be identified from the posts 242. For example, a user of a social networking application may have submitted a post 242 stating, "I purchased an XYZ Tablet from Example.com." The "XYZ Tablet" item, recognized by the natural language processor 221, may be compared to the catalog 230 to determine whether the item is sold, for example, through the electronic commerce application 215. In the event an item is identified, the item may be associated with the post 242. Such association may be used later in determining the customer satisfaction of an item (e.g., using the sentiment level), determining what in the item could be improved, etc.

Similarly, the site monitoring service 218 may determine whether one or more users of the electronic commerce application 215 is able to be identified from one or more of the posts 242. For example, a user of the electronic commerce application 215 may have voluntarily "linked" his or her social networking account(s) with the electronic commerce application 215. The site monitoring service 218 may determine that a user name associated with a post 242 is the same as a user name previously linked to the electronic commerce application 215, or similar system. In the event a user is identified, the user may be associated with the post 242. Such association may be used later in, for example, suggesting items to the user, identifying preferences associated with the user, analyzing customer satisfaction, verifying shipment of an item, and/or handling customer disputes.

It may be determined whether an action should be initiated based at least in part on the occurrence of a condition, wherein the action to be initiated and/or the condition are defined by the user and accessed by the site monitoring system 218. For example, a merchant may have previously defined that the merchant is to receive an e-mail in response to a certain number of posts 242 comprising "XYZ Tablet" being found within a 24 hour interval. Alternatively, the merchant may have defined that the price on an "XYZ Tablet" the merchant is selling via electronic commerce application 215 is to be reduced or increased in the event the item is "trending" on one or more social networking sites. If a post 242 is associated with a negative sentiment level and/or contains information associated with an issue, the post 242 may be forwarded to a customer service agent.

The site monitoring system 218 may then encode a user interface 272 comprising the posts 242 and/or information about the posts 242. For example, FIG. 1 depicts a graph comprising analytics for the keywords "XYZ Tablets" found on two social networking sites (i.e., Site #1 and Site #2). The site monitoring system 218 may then transmit the user interface 272 to a client 206 for rendering in a display.

Figure 3:
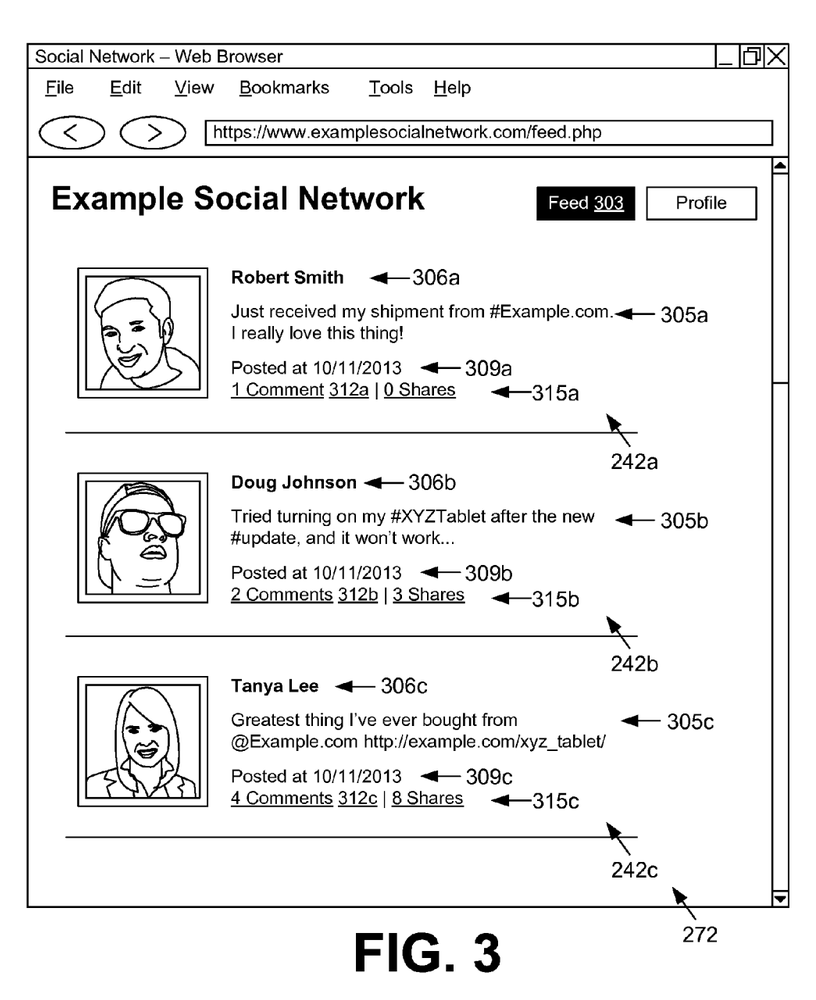
FIG. 3 is a drawing of an example of a user interface rendered by a client in the networked environment of FIG. 2 according to various embodiments of the present disclosure.

Referring next to FIG. 3, shown is an example social networking application comprising posts 242a, 242b, and/or 242c made by users in the form of a feed 303 in a user interface 272. In the non-limiting example of FIG. 3, a social networking application may comprise a feed 303 showing a multitude of posts 242 from a multitude of users of the social networking application. A post 242 typically comprises one or more messages 305a, 305b, and/or 305c, as may be appreciated. Moreover, various information may be displayed in association with a post 242. For example, a name 306a, 306b, and/or 306c of the user creating and/or sharing a post 242 originally created by another user may be shown. Additionally, timestamps 309a, 309b, and/or 309c showing the date and/or time in which a post 242 was created and/or shared on the social networking application may be shown.

As shown in FIG. 3, social networking application generally comprises features permitting other users to interact with a post 242. For example, a user may comment on a post 242 via a commenting feature 312a, 312b, and/or 312c. A user may also be able to share a post 242 via a sharing feature 315a, 315b, and/or 315c. Moreover, a feature permitting a user to express sentiment towards a post 242 may be provided (not shown). As a non-limiting example, a user may rate a post 242 with one to five stars identifying the user's sentiment towards the post 242. As may be appreciated, the various features permitting users to interact with a post 242 may be identified to determine a general sentiment level of the post 242. The sentiment level may be a sentiment level reflecting other users' sentiments towards the post 242 as opposed to the author of the post 242's sentiment level. The site monitoring service 218 may identify this distinction and store a sentiment level corresponding to other social networking users' sentiments towards the post 242. In addition, the site monitoring service 218 may proceed with initiating an action (e.g., transmitting a notification to a merchant selling an item) in response to the identification of the sentiment levels.

As discussed above, the site monitoring service 218 may identify a post 242 (as well as the various information associated with the post 242) from a social networking application. If the post 242 comprises relevant information, information associated with the post 242 may be saved, for example, in data store 212. Moreover, other comments identified relevant to a post 242 may be analyzed in addition to the post 242 itself.

Figure 4:
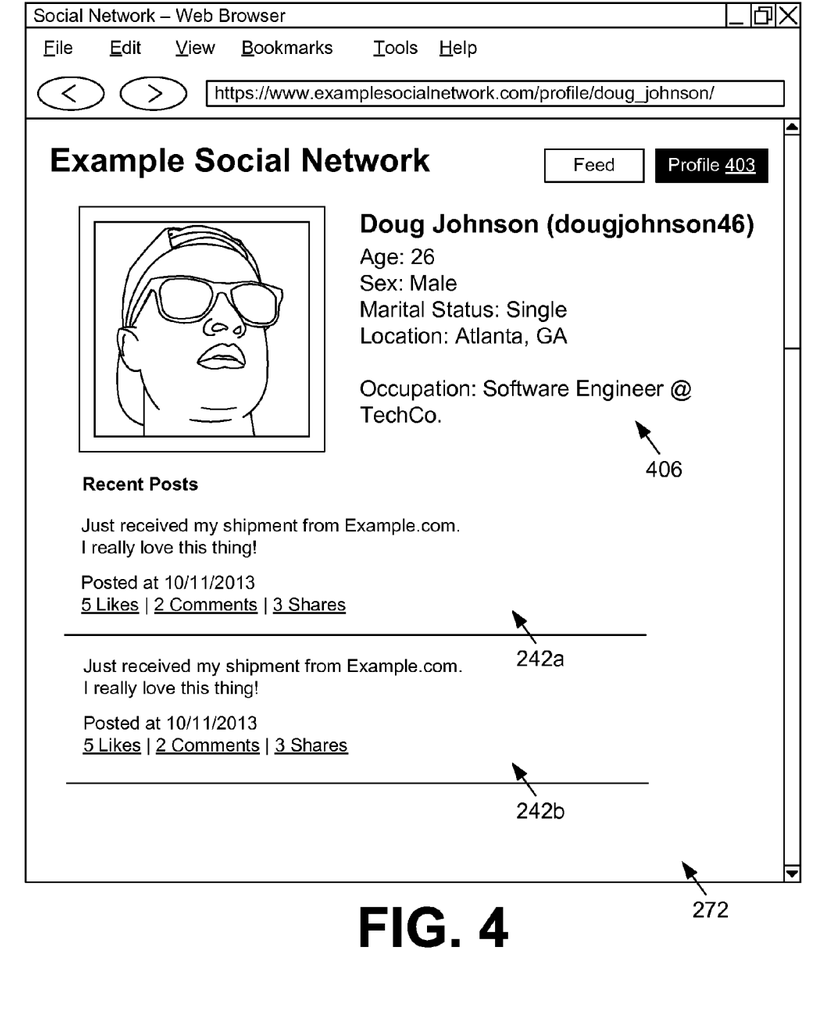
FIG. 4 is a drawing of an example of a user interface rendered by a client in the networked environment of FIG. 2 according to various embodiments of the present disclosure.

Turning now to FIG. 4, shown is an example user interface 272 of a profile page 403 displaying a profile 275 (FIG. 2) corresponding to a user of a social networking application. A profile page may comprise various information volunteered and/or submitted by the user. For example, a profile page may contain information 406 such as the age, sex, marital status, location, and/or occupation of a user. In addition, a profile page may contain posts 242 made by a user.

As may be appreciated, the site monitoring service 218 (FIG. 2) may only access information made publicly available and/or volunteered by the user and the social networking application in order to respect the privacy of the user. For example, a user may volunteer information contained on his or her social networking profile in exchange for offers tailored to that user. Accordingly, the publicly available information of a user may be associated with one or posts 242a and/or 242b made by the user.

Figure 5A:
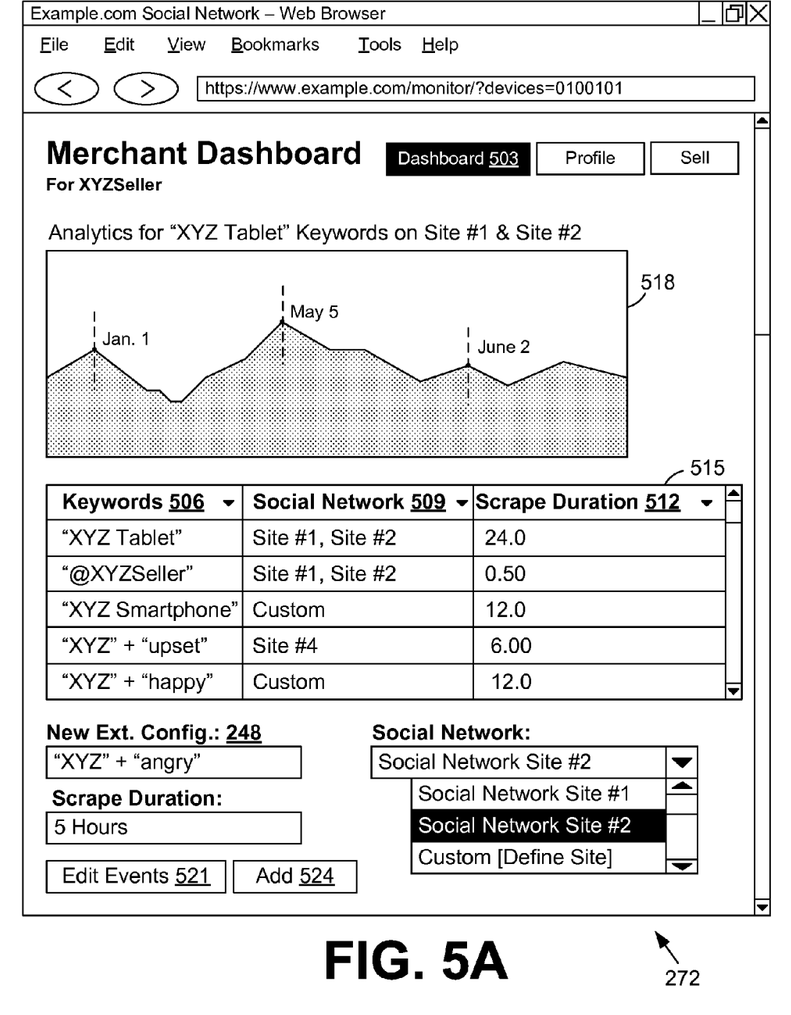
FIGS. 5A-B are exemplary drawings of user interfaces rendered by a client in the networked environment of FIG. 2 according to various embodiments of the present disclosure.

Moving on to FIG. 5A, shown is a non-limiting example a user interface 272 that may be accessed by a user of the site monitoring service 218 (FIG. 2). In the non-limiting example of FIG. 5A, a "dashboard" 503 is tailored to a merchant of an electronic commerce application 215 (FIG. 2). For example, a merchant may desire to know sentiment levels of past or future buyers related to products and/or services provided by the merchant. The merchant may define keywords 506, social networks 509, scrape durations 512, and/or other information to be used by the site monitoring service 218. Accordingly, the site monitoring service 218 may access the social networks 509 defined by the merchant at the defined scrape durations 512 to search for the defined keywords 506. The merchant's definitions may be provided to the merchant via a table 515 to facilitate the addition, modification, and/or removal of definitions from an extraction configuration 248.

As a non-limiting example, a merchant may sell electronic equipment under a mock "XYZ" brand. The merchant may desire to determine sentiment levels of buyers of the "XYZ" brand (e.g., to determine whether to continue selling the "XYZ" products). Accordingly, the merchant may define an extraction configuration 248 comprising a keyword 506 and/or search string of "'XYZ'+'angry'." The merchant may further define a social network site 509 and a scrape duration 512. The site monitoring service 218 may search the defined social network site 509 at the defined scrape duration for the keyword 506 and/or search string defined by the merchant.

In addition to sentiment levels, various statistics and information may be derived from posts 242 identified by the site monitoring service 218. For example, a graph 518 may be presented comprising the number of posts 242 containing the string "XYZ Tablet" between a predefined range of time. As may be appreciated, other information and/or analytics associated with identified posts 242 may be shown. A user may modify previously created extraction configurations 248 by, for example, engaging a modify component 521. Similarly, a user may create a new extraction configuration 248 by, for example, engaging an add component 524. As discussed above with respect to FIG. 2, a user may further define notifications 245 to transmit and/or actions to initiate upon detection of a user defined condition, as will be discussed in greater detail below.

Figure 5B:
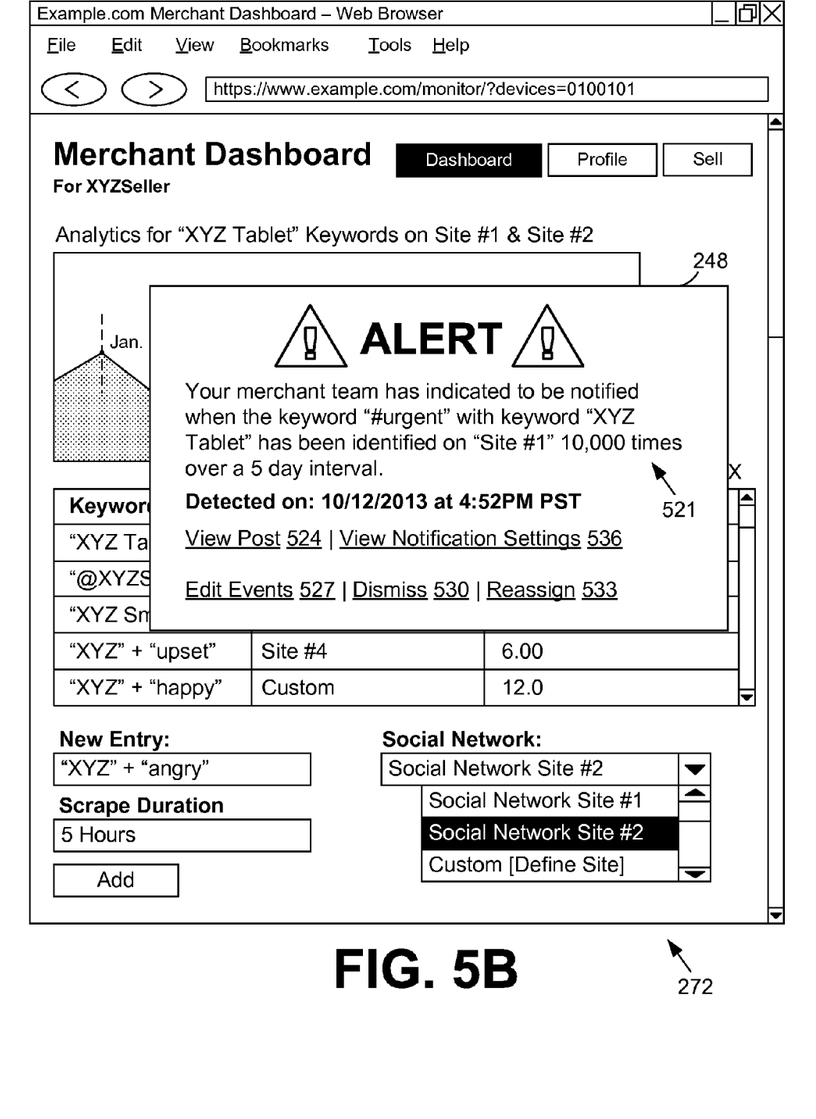

Referring next to FIG. 5B, shown is a non-limiting example of the user interface 272 of FIG. 5A that may be accessed by a user of the site monitoring service 218. As discussed above with respect to FIG. 5A, a "dashboard" may be tailored to a merchant of an electronic commerce application 215 (FIG. 2). As discussed above with respect to FIG. 2, a user may define notifications 245 to transmit and/or actions to initiate upon detection of a keyword and/or search string defined by a user. For example, a notification 245 may take the form of an alert dialog rendered in the user interface 272, although a notification may further comprise, for example, an e-mail, SMS message, etc. A notification 245 may comprise a message 521 stating the purpose of the notification. In the non-limiting example of FIG. 5B, a merchant or customer service management may be notified, for example, when the merchant has created an action to be notified when the keyword "#urgent" is used in association with "XYZ Tablet" on a particular source (i.e., "Site #1").

Various features may be associated with a notification 245 as may be appreciated. For example, a notification 245 may provide a URL link 524 to view the post 242 in, for example, the "dashboard" or via the site the post 242 originated. The user may also be prompted with the ability to edit 527 the defined action, dismiss 530 the defined action, and/or reassign 533 the defined action (e.g., to another merchant and/or customer service agent). Moreover, the user may be prompted to view the notification settings 536 associated with the action and/or notification.

Figure 6A:
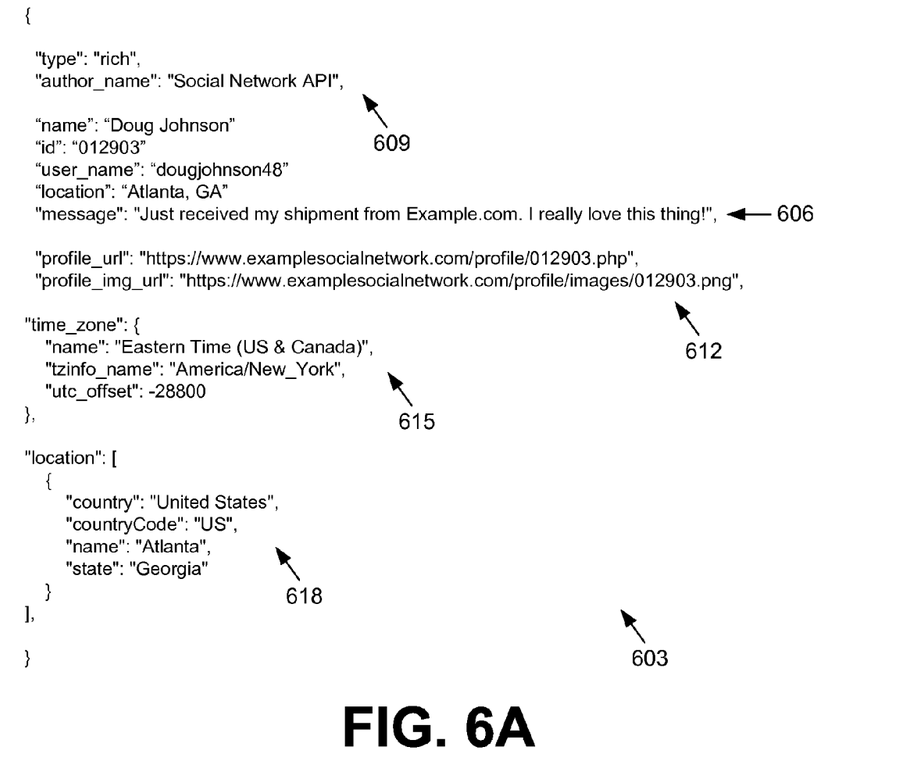
FIGS. 6A-B are exemplary code representations that may be provided by a social network in the networked environment of FIG. 2 according to various embodiments of the present disclosure.

Referring next to FIG. 6A, shown is an exemplary data structure that may be transmitted by a social networking application to the site monitoring service 218 upon receipt of a request transmitted by the site monitoring service 218. In the non-limiting example of FIG. 6A, a JavaScript Object Notification (JSON) data structure 603 may be received by the site monitoring service 218 from a defined source (e.g., a social networking site). The JSON data structure 603 may be parsed by the site monitoring service 218 to obtain information made publicly available by the social networking application via the social networking application's API. Such information may comprise a message 606 made in the post 242, the social network API name 609, a profile image URL 612, a time zone 615 of the post 242, and/or a location 618 associated with the post 242 (e.g., a location where the post 242 was made).

Although the non-limiting example of FIG. 6A depicts an exemplary JSON data structure 603, other data interchange technologies and/or web services may be employed. For example, Representational State Transfer (REST), Simple Object Access Protocol (SOAP), Extensible Markup Language (XML), and/or any other data interchange technology or web service may be employed.

Figure 6B:
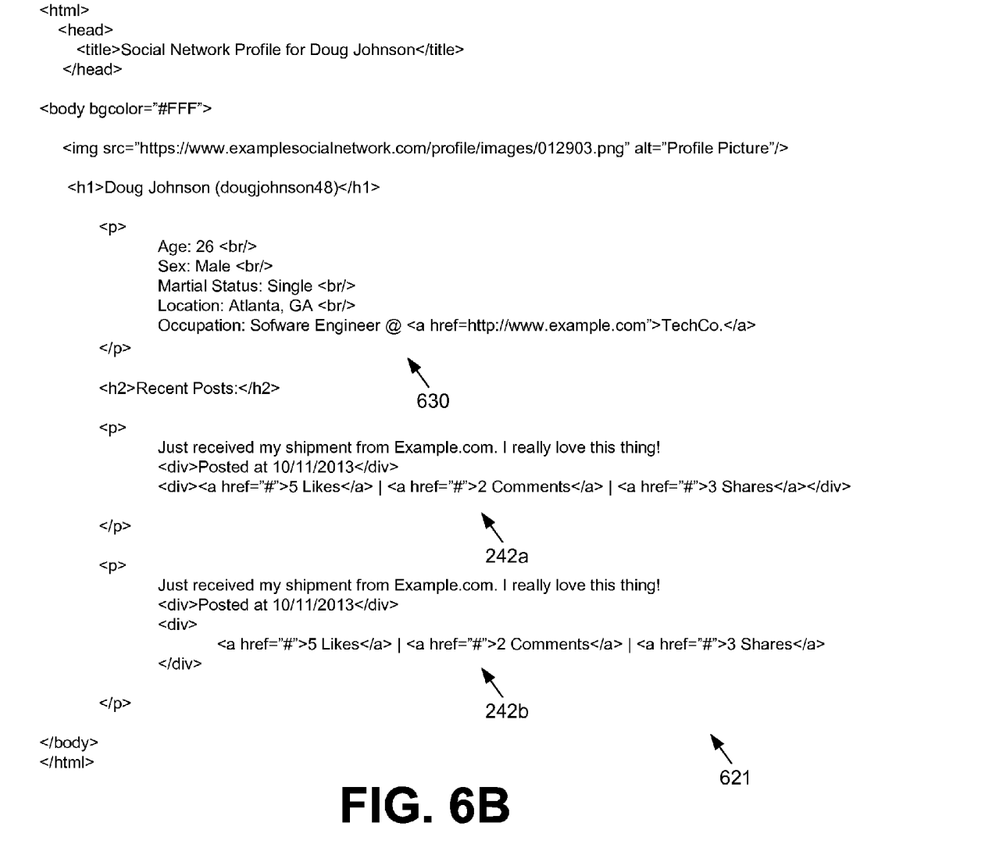

Turning now to FIG. 6B, shown is an exemplary HyperText Markup Language (HTML) document 621 that may be encoded by a social networking application. The site monitoring service 218 may access the HTML document 621 to access information within the HTML document 621, for example, in the event a web service is not provided by the social networking application. Similar to the JSON data structure 603 (FIG. 6A), the HTML document 621 may be parsed by the site monitoring service 218 to obtain information made publicly available by the social networking application. The HTML document 621 may comprise one or more posts 242a and/or 242b. Additionally, the HTML documents 621 may comprise information 630 associated with the author of the posts 242. Although the non-limiting example of FIG. 6B depicts an HTML document 621, other data interchange technologies and/or web services may be employed, as discussed above with respect to FIG. 6A.

Figure 7:
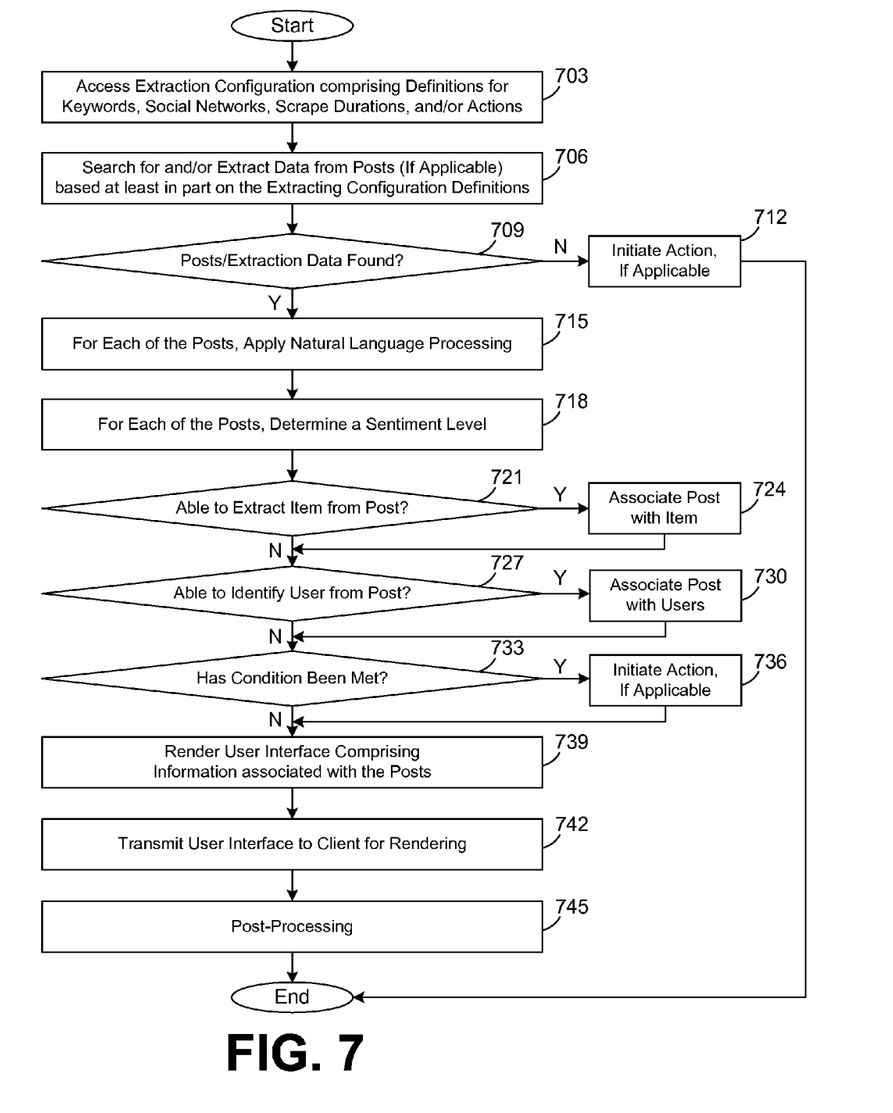
FIG. 7 is a flowchart illustrating one example of functionality implemented as portions of a site monitoring service executed in a computing environment in the networked environment of FIG. 2 according to various embodiments of the present disclosure.

Moving on to FIG. 7, shown is a flowchart that provides one example of the operation of a portion of the site monitoring service 218 according to various embodiments. It is understood that the flowchart of FIG. 7 provides merely an example of the many different types of functional arrangements that may be employed to implement the operation of the portion of the site monitoring service 218 as described herein. As an alternative, the flowchart of FIG. 7 may be viewed as depicting an example of steps of a method implemented in the computing environment 203 (FIG. 2) according to one or more embodiments.

Beginning with box 703, an extraction configuration 248 comprising definitions for keywords, social networks, scrape durations, and/or actions may be accessed and/or received by the site monitoring service 218. As a non-limiting example, a merchant may have defined keywords to be searched for on defined social networks at defined scrape durations. The site monitoring service 218 may have stored the definition in, for example, data store 212 to be accessed at a later time.

In box 706, the definitions are used to search for and/or extract data from posts 242. For example, a merchant may have defined a search to occur on a predefined social networking application, repeated every half hour, looking for "XYZ Tablet." The definitions (the social networking application, the scrape duration, and/or the search string) may be used to search the predefined social networking application in order to obtain extraction data from the one or more posts 242. In box 709, it is determined whether the search was able to find any posts 242. In the event no posts 242 are found in the query, in box 712, an action may be initiated. For example, the merchant may have predefined the action of receiving an e-mail when a search has been initiated resulting in no posts 242 being found. If no posts 242 are found, no further analysis may be necessary.

In box 715, natural language processing may be applied to the posts 242 and/or the information extracted from the posts 242. The natural language processor 221, or a similar service, may derive meaning from the posts 242 by employing known heuristics and/or derivation strategies. For example, a user may have submitted a post 242 stating, "I purchased a widget from Example.com." The natural language processor 221 may derive that the author of the post 242 claimed to have purchased an item (the widget) from an electronic commerce site (Example.com).

In box 718, a sentiment level may be determined from the posts 242 by employing the sentiment determination service 224. For example, a user may have submitted a post 242 stating, "I purchased a widget from Example.com, and I love it!" Alternatively, the user may have submitted a post 242 stating, "I purchased a widget from Example.com, and I hate it!" The sentiment determination service 224 may identify that the word "love" or "hate" was used in the post 242. Accordingly, the sentiment determination service 224 may identify and associate a sentiment level with each of the posts 242.

Next, in box 721, it may be determined whether an item available in the catalog 230 (FIG. 2) is able to be identified. For example, a user of a social networking application may have submitted a post 242 stating, "I purchased an XYZ Tablet from Example.com." The "XYZ Tablet" item, recognized by the natural language processor 221, may be compared to the catalog 230 (FIG. 2) to determine whether the item is sold, for example, through the electronic commerce application 215. In the event an item is identified, in box 724, the item may be associated with the post 242. Such association may be used later in determining the customer satisfaction of an item (e.g., using the sentiment level), determining what in the item could be improved, etc.

Similarly, in box 727, it may be determined whether a user of the electronic commerce application 215 is able to be identified. For example, a user of the electronic commerce application 215 may have voluntarily "linked" his or her social networking account(s) with the electronic commerce application 215. The site monitoring service 218 may determine that a user name associated with a post 242 is the same as a user name previously linked to the electronic commerce application 215, or similar system. In the event a user is identified, in box 730, the user may be associated with the post 242. Such association may be used later in, for example, suggesting items to the user, analyzing customer satisfaction, verifying shipment of an item, and/or handling customer disputes.

In box 733, it may be determined whether a condition, previously defined by the user in association with an action, has been identified. For example, a merchant may have previously defined that the merchant is to receive a notification 245 (FIG. 2) (e.g., an e-mail, SMS, etc.) in response to a certain number of posts 242 comprising "XYZ Tablet" being found within a 24 hour interval. Alternatively, the merchant may have defined that the price on an "XYZ Tablet" the merchant is selling via electronic commerce application 215 is to be reduced or increased in the event the item is "trending" on one or more social networking sites. In the event the condition has be identified, the action previously defined by the user may be initiated, in box 736.

In one embodiment, a customer service agent may receive posts 242 comprising issues and/or problems experienced by customers. An action may be defined to resolve an identified issue in the post 242. For example, if a user has stated in a post 242, "My XYZ Tablet operating system freezes when I turn it on," the service monitoring system 218 may transmit a notification to a customer service agent associated with the electronic commerce application 215 (FIG. 2).

In box 739, a user interface 272 (FIG. 2) comprising the posts 242 and/or extraction data extracted from the posts 242 may be encoded. For example, FIG. 1 depicts a graph 103 (FIG. 1) comprising analytics for the keywords "XYZ Tablets" found on two social networking sites (i.e., Site #1 and Site #2). In box 742, the user interface 272 may be transmitted to a client 206 (FIG. 2) for rendering in a display 266 (FIG. 2).

Finally, in box 745, post-processing may be conducted on the extracted data. Post-processing may include, for example, generating statistics, indexing data for improved performance, applying machine learning processor to improve components of the system, etc. Although depicted as a final step in FIG. 7, post-processing may occur asynchronously during execution of any of the components of the computing environment 203, as may be appreciated.

Figure 8:
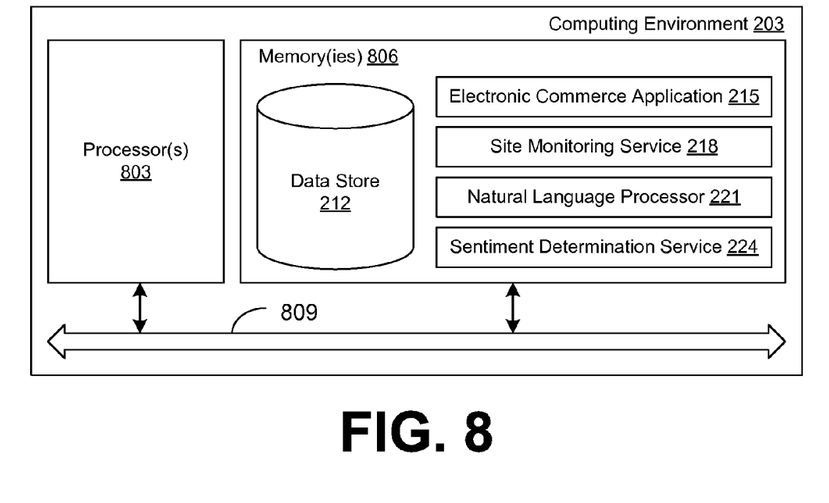
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 203. Each computing device 203 includes at least one processor circuit, for example, having a processor 803 and a memory 806, both of which are coupled to a local interface 809. To this end, each computing device 203 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the electronic commerce application 215 (FIG. 2), the site monitoring service 218 (FIG. 2), the natural language processor 221 (FIG. 2), the sentiment determination service 224 (FIG. 2), and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the electronic commerce application 215, the site monitoring service 218, the natural language processor 221, the sentiment determination service 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows the functionality and operation of an implementation of portions of the site monitoring service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215, the site monitoring service 218, the natural language processor 221, and/or the sentiment determination service 224, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, the at least one program having instructions that cause the at least one computing device to perform a method comprising:

receiving an extraction configuration defined by a merchant user offering an item through an electronic commerce application, the extraction configuration comprising a specification of the item, a social network, an extraction time, a condition, and an action to be performed in response to the condition being met;

accessing data of the social network at the extraction time to obtain extraction data from a plurality of posts that include a mention of the item;

for at least one of the plurality of posts associated with the extraction data:

causing performance of the action in response to detection of the condition being met based on an analysis of the extraction data associated with the at least one of the plurality of posts, wherein causing performance of the action in response to detection of the condition being met comprises automatically adjusting a price of the item set by the merchant user through the electronic commerce application in response to a number of mentions of the item in the at least one of the plurality of posts meeting a predefined threshold that indicates that the item is trending on the social network;

storing the at least one of the plurality of posts in a data store in association with the item offered by the merchant user in response to the mention of the item in the at least one of the plurality of posts;

identifying a name associated with an originator of the at least one of the plurality of posts;

querying the data store using the name associated with the originator to identify a user account of the electronic commerce application, wherein an association of a social networking account of the originator has been made with the user account of the electronic commerce application; and identifying a sentiment level for the at least one of the plurality of posts using a natural language processor to determine whether a purchase of the item made on the user account is associated with a positive sentiment or a negative sentiment; and encoding at least a portion of the extraction data in a user interface for access by the merchant user on a client device.

2. The non-transitory computer-readable medium of claim 1, wherein accessing the data of the social network further comprises:
  causing a request for the plurality of posts to be communicated to the social network via an application programming interface (API); and
  accessing a response received from the social network, the response comprising the plurality of posts and the extraction data.

3. The non-transitory computer-readable medium of claim 1, wherein accessing the data of the social network further comprises:
  accessing a network page comprising the at least one of the plurality of posts; and
  extracting the extraction data from the at least one of the plurality of posts through a source code of the network page.

4. A system, comprising:
  at least one computing device;
  a data store in communication with the at least one computing device; and
  program instructions executable in the at least one computing device that, when executed, cause the at least one computing device to perform a method comprising:
    accessing an extraction configuration previously defined by a user and stored in the data store, the extraction configuration comprising a specification of a keyword associated with an item offered through an electronic commerce application, a social network, and an extraction time;
    accessing data of the social network at the extraction time in accordance with the extraction configuration to obtain extraction data from at least one post comprising the keyword;
    identifying a name associated with an author of the at least one post;
    querying the data store using the name associated with the author of the at least one post to identify a user account of the electronic commerce application;
    encoding at least a portion of the extraction data and information associated with the user account in a user interface for rendering on a client device; and
    causing performance of an action in response to a predefined condition associated with the action being met based at least in part on an analysis of the extraction data, the action and the predefined condition being specified in the extraction configuration, wherein causing performance of the action in response to detection of the condition being met comprises automatically adjusting a price of the item through the electronic commerce application in response to a number of mentions of the item in the at least one post meeting a predefined threshold that indicates that the item is trending on the social network.

5. The system of claim 4, wherein the method performed by the at least one computing device further comprises determining whether the at least one post comprises the name associated with the author of the at least one post.

6. The system of claim 4, wherein the method performed by the at least one computing device further comprises identifying, using a natural language processor, that the author made a purchase of the item through the electronic commerce application using the user account.

7. The system of claim 6, wherein the method performed by the at least one computing device further comprises:
  determining a sentiment level for the at least one post using the natural language processor; and
  determining whether the purchase of the item made using the user account is associated with a positive sentiment or a negative sentiment.

8. The system of claim 4, wherein accessing the data from the social network further comprises:
  causing a request for the at least one post to be communicated to the social network via an application programming interface (API); and
  accessing a response received from the social network, the response comprising the extraction data.

9. The system of claim 4, wherein the method performed by the at least one computing device further comprises accessing the extraction data received from the social network in response to receipt of a push notification communicated to the at least one computing device from the social network.

10. The system of claim 4, wherein the method performed by the at least one computing device further comprises encoding an extraction user interface for access through the electronic commerce application that obtains the extraction configuration from at least one form of the extraction user interface, the extraction configuration being defined in association with the item offered through the electronic commerce application.

11. The system of claim 4, wherein accessing the data of the social network at the extraction time further comprises:
  accessing a network page comprising the at least one post; and
  extracting the extraction data from the at least one post through a source code of the network page.

12. A method, comprising:
  accessing, by at least one computing device, an extraction configuration defined through an electronic commerce application, the extraction configuration comprising a specification of a search string, a network site, and an extraction time;

accessing, by the at least one computing device, the network site to perform a search utilizing the search string at the extraction time;

storing, by the at least one computing device, extraction data obtained as a result of the search in memory, the extraction data comprising information obtained from at least one post using at least one keyword specified in the search string;

identifying, by the at least one computing device, an identifier that identifies an author of the at least one post;

identifying, by the at least one computing device, a user account of the electronic commerce application based at least in part on the identifier and an association made between a profile of the network site and the user account of the electronic commerce application;

encoding, by the at least one computing device, at least a portion of the extraction data and information associated with the user account in a user interface for access on a client device; and causing, by the at least one computing device, performance of an action in response to a predefined condition associated with the action being met based at least in part on an analysis of the extraction data, the action and the predefined condition being specified in the extraction configuration, wherein causing performance of the action in response to detection of the condition being met comprises automatically adjusting a price of at least one item through the electronic commerce application in response to a number of mentions of the at least one item in the at least one post meeting a predefined threshold that indicates that the at least one item is trending on the network site.

13. The method of claim 12, wherein the action further comprises communicating, by the at least one computing device, a notification to another computing device, the notification indicating that the predefined condition has been met.

14. The method of claim 12, wherein causing, by the at least one computing device, performance of the action in response to the predefined condition associated with the action being met further comprises:

identifying, by the at least one computing device, a use of the at least one keyword in the at least one post; and communicating, by the at least one computing device, an alert that indicates that the use of the at least one keyword in the at least one post has been identified.

15. The method of claim 12, further comprising determining, by the at least one computing device a sentiment level for the at least one post based at least in part on an analysis of the extraction data.

16. The method of claim 12, wherein the network site comprises a social networking site or a blog defined in the extraction configuration.

17. The method of claim 12, further comprising generating, by the at least one computing device, a graph comprising statistical information associated with the extraction data for rendering on the client device.

18. The method of claim 12, further comprising:

encoding, by the at least one computing device, a first user interface for access through the electronic commerce application that receives the extraction configuration from at least one form of the first user interface, the extraction configuration being defined in association with the at least one item offered for sale through the electronic commerce application; and encoding, by the at least one computing device, a second user interface for access through the electronic commerce application that comprises at least a portion of the extraction data shown in association with the at least one item offered for sale.

19. The method of claim 12, further comprising obtaining, by the at least one computing device, the extraction data from the network site by:

causing, by the at least one computing device, a request for the at least one post to be communicated to the network site via an application programming interface (API); and accessing, by the at least one computing device, a response received from the network site, wherein the response comprises the extraction data.

\* \* \* \* \*